United States Patent [19]
Crean

[11] Patent Number: 5,746,473
[45] Date of Patent: May 5, 1998

[54] TRAVEL TRAILER CHASSIS

[75] Inventor: Johnnie Robert Crean, Chino, Calif.

[73] Assignee: Alfa Leisure, Inc., Chino, Calif.

[21] Appl. No.: 476,436

[22] Filed: Jun. 7, 1995

[51] Int. Cl.⁶ .................................................. B60R 11/00
[52] U.S. Cl. ............................................ 296/181; 296/168
[58] Field of Search ............................. 296/168, 24.1, 296/178, 181, 182, 208, 37.1, 37.6, 156

[56] References Cited

U.S. PATENT DOCUMENTS

| | | |
|---|---|---|
| 3,165,350 | 1/1965 | Willson . |
| 3,254,914 | 6/1966 | Steck . |
| 3,287,058 | 11/1966 | Wells . |
| 3,565,480 | 2/1971 | McCollum et al. . |
| 4,014,586 | 3/1977 | Swofford . |
| 4,106,732 | 8/1978 | Whiting . |
| 4,322,108 | 3/1982 | McPherson . |
| 4,652,041 | 3/1987 | Barber et al. . |
| 4,653,125 | 3/1987 | Porter . |
| 4,728,144 | 3/1988 | Crean . |
| 4,746,164 | 5/1988 | Crean ................................ 296/156 X |
| 4,776,631 | 10/1988 | Sargent et al. . |
| 4,957,323 | 9/1990 | Johnson ............................ 296/37.1 X |
| 4,974,899 | 12/1990 | Sargent ............................ 296/24.1 X |

*Primary Examiner*—Joseph D. Pape
*Attorney, Agent, or Firm*—Knobbe, Martens, Olson & Bear, LLP

[57] ABSTRACT

An improved travel trailer chassis that has a main section, which is connected to the axles of the wheels, a first elevated section that is connected to a forward end of the main section and is elevated above the main section and a second elevated section that is connected to a forward end of the first elevated section and is elevated above the first elevated section. The first elevated section is configured to receive a floor and fixtures to support a bathroom. A trunk space for storage is defined by a floor that extends forward from the main section of the chassis underneath the first elevated section of the chassis. One or more sewage tanks are mounted to the first elevated section of the chassis immediately beneath and substantially adjacent the floor of the bathroom supporting the fixtures. A drain assembly extends through the trunk space to an exhaust positioned outside of the trailer. The controls of the drain assembly are advantageously located within the trunk space at an elevated position above the ground.

37 Claims, 6 Drawing Sheets

TRAVEL TRAILER CHASSIS

BACKGROUND OF THE INVENTION

1. Field of the Invention

The present invention relates to travel trailers and, in particular, concerns an improved chassis for travel trailers which provides better positioning for sewage tanks and allows for a trailer construction that makes more efficient use of storage space.

2. Description of the Related Art

Figures 1A, 1B:
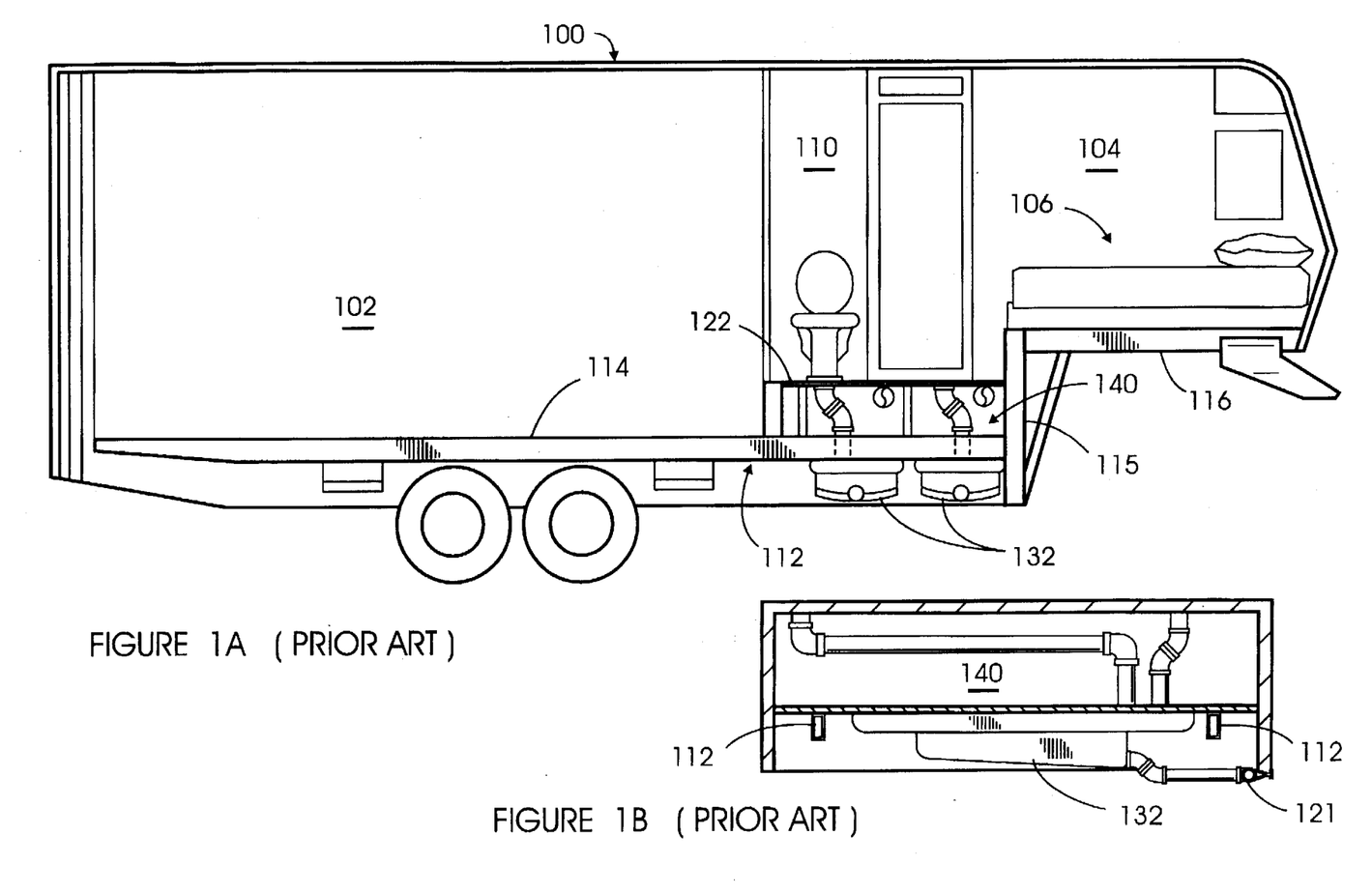
FIG. 1A is a sectional side view of a typical prior art trailer assembly.
FIG. 1B is a sectional front detailed view of the trunk space of the prior art trailer shown in FIG. 1.

Travel trailers are towed vehicles that have been outfitted with some or all of the facilities of a home for the convenience of the traveller. These types of trailers have become very popular throughout the world in the last several decades. One relatively recent innovation in travel trailers is the "fifth wheel" trailer wherein the forward section of the trailer is elevated and the hitch mechanism is mounted on the bottom side of the elevated section of the trailer. The hitch mechanism is typically attached to a towing apparatus mounted in the bed of a pickup truck. A cross-sectional view of a typical fifth wheel trailer is illustrated in FIG. 1A. The fifth wheel trailer configuration allows the towing vehicle to tow a generally larger trailer.

As shown in FIG. 1A, the typical fifth wheel travel trailer 100 has a main level 102 and an elevated level 104. The elevated level 104 typically contains a bedroom 106 and the main level 102 contains eating facilities and the like (not shown). Generally, a bathroom 110 is interposed between the bedroom 106 and the main level 104. In the typical prior art fifth wheel travel trailer, the trailer is supported on a two-level chassis 112. The chassis 112 includes a main section 114, an elevated section 116 and an interconnecting vertical section 115. The main level 102 of the trailer is built on top of the main section 114 of the chassis and the elevated level 104 is built on top of the elevated section 116 of the chassis 112.

In the typical prior art trailer 100, the bathroom 110 is positioned on a floor 122 that is built up and supported above the main section 114 of the trailer chassis 112 in a position substantially adjacent the elevated level 104 of the trailer 100. Generally, one or more sewage storage tanks 132 are mounted on the chassis 112 underneath the bathroom 110. As shown in FIG. 1B, in the typical prior art fifth wheel trailer configuration, the tanks are mounted on the main section 114 of the frame and plumbing extends from the bathroom 110 to the tanks 130, 132 through a storage space, generally referred to as a trunk space 140, that extends between the floor of the bathroom 110 and the chassis 112.

One shortcoming of this configuration is that the plumbing in the trunk space 140 limits the use of the space 140. Specifically, as illustrated in FIG. 1B, the plumbing can occupy a substantial portion of the trunk space 140 leaving the space unavailable for storage of larger items. Further, if can be appreciated that it is difficult to load heavier objects in the storage space as the storage space is elevated above the sewage tanks. It can also be appreciated that, since the sewage tanks and drains are mounted on the chassis, they are often exposed to the outside environment which can result in the contents of the tanks and drains freezing in cold weather, thereby hindering draining of the tank.

A further shortcoming of this configuration is that, since the sewage tanks are located adjacent the bottom of the trailer, a drainage control 121 (FIG. 1B) is also typically located adjacent the bottom of the chassis of the trailer. In many fifth wheel trailer configurations, a user who is draining the sewage tanks ends up having to sit in the dirt or climb underneath the trailer to manipulate the controls to drain the sewage tanks. It can be appreciated that it is generally not desirable to have to sit or crawl in the dirt surrounding a sewage dumping facility.

SUMMARY OF THE PRESENT INVENTION

In the preferred embodiment, the main section of the chassis is mounted to the wheel axle(s) of the trailer. Forward of the main section, the chassis of the trailer has a first elevated section which is elevated above the main section. In the preferred embodiment, a second elevated section of the chassis is positioned forward of the first elevated section of the chassis and the second elevated section is elevated above the first elevated section. In the preferred embodiment, the bathroom facilities of the trailer are mounted on the first elevated section of the chassis. Further, the bedroom facilities of the trailer are mounted on the second elevated section of the chassis. This allows the tanks to be positioned adjacent the chassis of the trailer, and thus be adequately supported, and still be raised sufficiently above the ground so that the valves and controls for the tanks are readily accessible to a user. Further, since the trunk space is below the tanks, it will be easier for a user to load heavy objects into the trunk space.

A significant feature of the preferred embodiment of the present invention is that, the sewage tanks are mounted to the first elevated section of the chassis immediately underneath the floor of the bathroom. The controls for the sewage tanks are positioned within the space immediately underneath the sewage tanks. It can be appreciated that since the tanks are mounted on an elevated section of the chassis, the tank drainage valves and controls will be elevated thereby reducing the need for the user to have to climb under the trailer to access the controls of the drainage valves. Further, since the drain assembly and controls can be positioned within the enclosed trunk space, the necessity of the user contacting the ground is further reduced and the likelihood of the contents in the drain assembly freezing is also minimized.

Another feature of the invention is that the utility of the storage trunk space beneath the tanks is substantially enhanced. In the preferred embodiment of the invention, the space immediately below the first elevated section is enclosed to provide this storage facility.

In the preferred embodiment, the tanks have a low profile so that, when they are mounted underneath the floor on the chassis, they are substantially retained adjacent the chassis. The trunk space is thus generally more accessible for storage purposes as only the drainage piping and controls are positioned within the trunk space.

These and other objects and advantages of the present invention will become more fully apparent from the following description and appended claims taken in conjunction with the accompanying drawings.

DETAILED DESCRIPTION OF THE PREFERRED EMBODIMENT

Figures 2A, 2B:
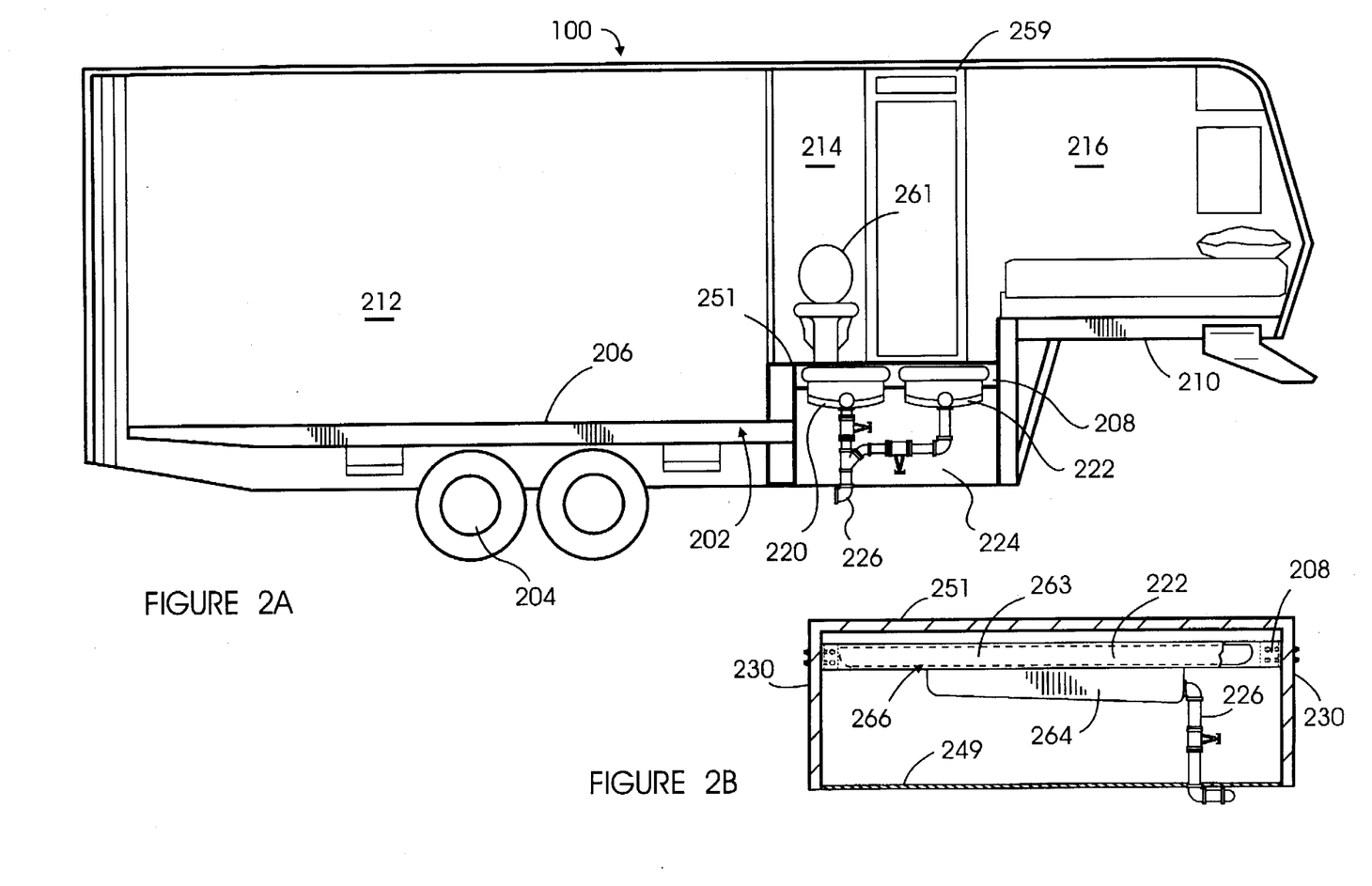
FIG. 2A is a sectional side view of the trailer assembly of the preferred embodiment.
FIG. 2B is a sectional front detailed view of the trunk space of the trailer assembly shown in FIG. 2A.

Reference will now be made to the drawings wherein like numerals refer to like parts throughout. FIGS. 2A and 2B illustrate a preferred embodiment of an improved travel trailer 200. As shown in FIG. 2A, the travel trailer 200 includes a chassis 202 (outlined in heavy black lines) that is coupled to the axles of the wheels 204. The chassis 202 has a main section 206, a first elevated section 208 and a second elevated section 210. Preferably, the main section 206 of the chassis 202 supports the floor, walls and equipment contained within a main section 212 of the trailer 200. The main trailer section 212 preferably includes the eating and cooking facilities, various common areas and auxiliary sleeping areas (not shown). The first elevated section 208 of the chassis 202 preferably supports the floor, walls and equipment contained within a bathroom 214. The second elevated section 210 of the chassis 202 preferably supports the floor, walls and equipment contained within a bedroom 216.

In the preferred embodiment, a black-water tank 220 and a gray-water tank 222 are mounted on the first elevated section 208 of the chassis 202 in an area immediately beneath the floor of the bathroom 214. Further, the space immediately beneath the tanks 220, 222 and first elevated section 208 of the chassis 202 is enclosed to define a storage trunk 224. The storage trunk 224 is largely clear of plumbing from the tanks 220, 222 except for a drain assembly 226. As shown in FIG. 2B, the drain line assembly 226 is preferably connected to the tanks 220, 222 at substantially one end of the tanks 220, 222 to leave the majority of the space within the trunk 224 empty. This allows for material and gear to be stored within the trunk 224. Advantageously, the sidewalls 230 of the trunk 224 are preferably equipped with access covers and doors (not shown) to allow access by a user to the trunk 224.

While, in the preferred embodiment, the trunk space 224 is comprised of the entire space below the first elevated section 208 of the chassis, it can be appreciated that trunk storage spaces can also be formed by mounting boxes to the chassis of the trailer without enclosing the entire space below the first elevated section 208 of the chassis 202.

Hence, as shown in FIGS. 2a and 2b, the tanks 220, 222 are preferably mounted on a first elevated section 208 of the chassis 202 that is elevated above the main section 206 of the chassis 202. This results in one or more control valves 228 of the drain line assembly 226 also being elevated above the main level 206 of the chassis 202. It can be appreciated that, if the first elevated section 208 of the chassis 202 is sufficiently elevated, the controls 228 of the drain line 226 can be located at a convenient level for the user to manipulate the controls, e.g., within the trunk space 224 at approximately waist level.

Figure 3:
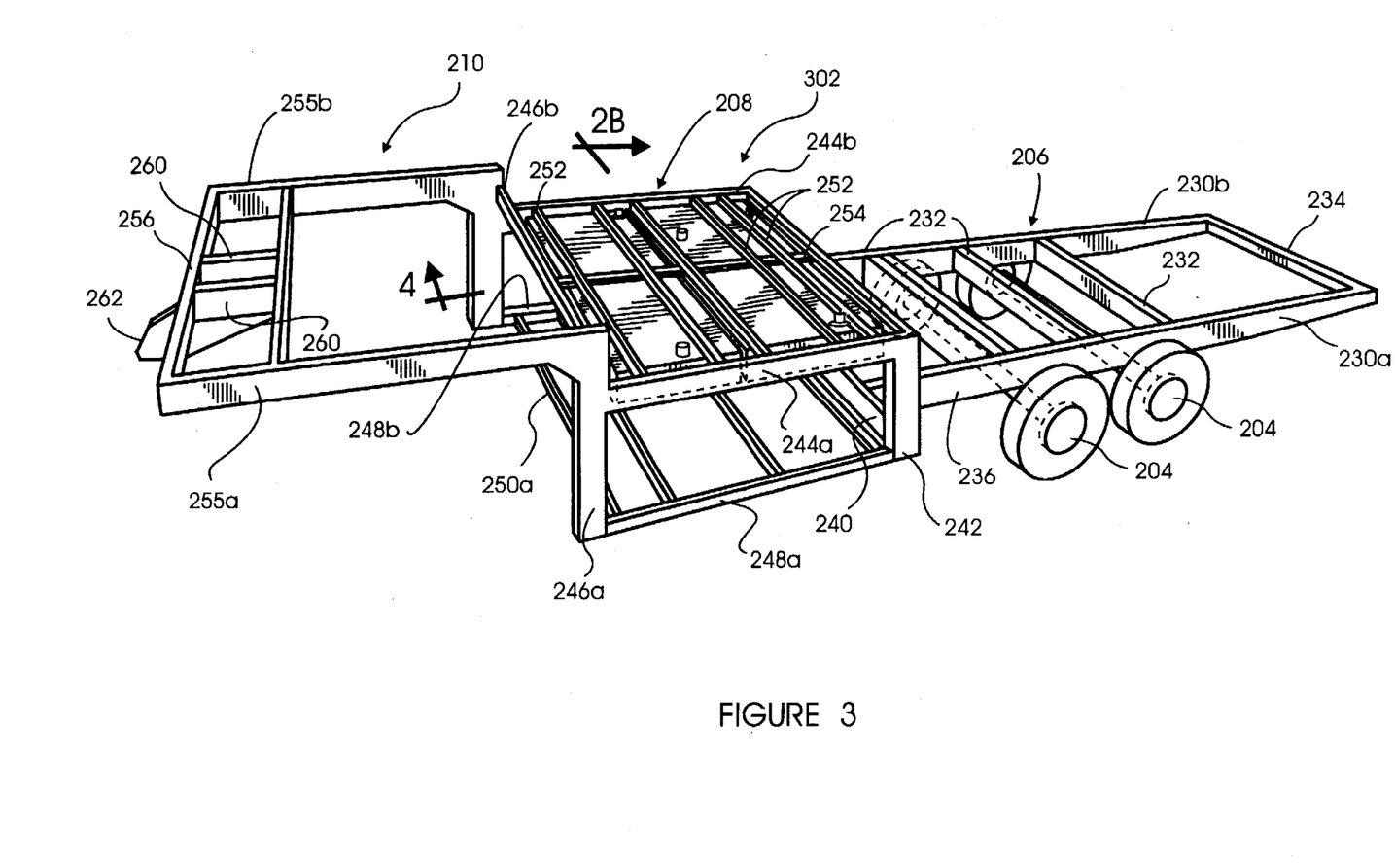
FIG. 3 is a perspective view of the chassis assembly of the trailer shown in FIG. 2A.

FIG. 3 is a perspective view of the chassis assembly 202 of the trailer 200. The main trailer section 206 of the chassis assembly 202 includes two main side chassis members 230a, 230b. The main side chassis members 230a, 230b are interconnected by a plurality of transverse members 232. The axle(s) of the trailer 200 are connected to the main side chassis members 230a, 230b in a well-known manner so that the wheels 204 allow for rolling movement of the chassis 202. The rear ends of the main side chassis members 230a, 230b are also interconnected by a rear transverse member 234.

In the preferred embodiment, the main side chassis members 230a, 230b, are made of pieces of 10-inch steel I-beam which may range in length from 12 to 30 feet. The main transverse members 232 are comprised of one or more pieces of 10-inch by 68-inch steel Z-bar. The rear transverse member 234 is preferably comprised of a piece of 3.5-inch by 68-inch steel L-bar. The main side chassis members 230a, 230b, the main transverse members 232 and the rear transverse chassis members 234 are preferably bolted and/or welded together in a well-known manner.

The main side chassis members 230a, 230b are respectively connected, at their forward ends 236, to a transverse chassis strut 240. The transverse chassis strut 240 projects outward from the main side chassis members 230a, 230b on either side of the vehicle. A first vertical chassis member 242 is connected to both of the outward ends of the transverse chassis strut 240 (one shown). The first vertical chassis members 242 each extend, in the preferred embodiment, perpendicularly upward and are respectively connected to a first end of a first elevated chassis member 244a, 244b. The first elevated chassis members 244a,b extend longitudinally along the length of the trailer 200 to define the outer dimensions of the first elevated section 208 of the trailer 200. The second ends of the first elevated chassis members 244a,b are respectively connected to two second vertical chassis members 246a, 246b.

The second vertical chassis members 246a, 246b each extend upward from the height of the first elevated section 208 to the height of the second elevated section 210 and may extend downward substantially to the height of the main section 206. Alternatively, the vertical members 246a, 246b may only extend upward and other members can be attached to the first elevated chassis members 244a,b so as to extend downwardly towards the trunk space 124 and provide a platform for jacks (not shown) to be positioned. At the bottom ends of the second vertical chassis members 246a, 246b, two longitudinal trunk support members 248a, 248b are respectively connected between the second vertical chassis members 246a, 246b and the first vertical chassis members 242. A plurality of transverse trunk support struts 250 extend between the longitudinal trunk support members 248a, 248b. Flooring material, such as sheet metal or sheets of composite material, is then attached to the trunk support members 248 and the trunk support struts 250 to form a floor 249 of the trunk 224 )shown in FIG. 2b).

Similarly, a plurality of transverse floor support struts 252 are connected to both of the first elevated chassis members 244a, 244b and a longitudinal support strut 254 is connected between the rearmost transverse support strut 252 and the forward most transverse support strut 252. Flooring material is then preferably attached to the chassis members 244a, 244b and the floor support struts 252, 254 to form a floor 251 (FIGS. 2a and 2b) of the first elevated section 208 of the trailer 200. In the preferred embodiment, a shower 259 and a toilet 261 (FIG. 2,) are then securely mounted on the floor 251 in the first elevated section 208 in a well-known manner.

In the preferred embodiment, the transverse chassis strut 240 is preferably comprised of one or more pieces of 2-inch by 8-inch steel rectangular tubing that is 0.180 inches thick and is 88 inches long. The two first vertical chassis members 242 are preferably welded onto the transverse chassis strut 240 and are preferably comprised of 2-inch by 5-inch rectangular steel tubing that is 0.25 inches thick and is 26.5 inches long. The two first elevated chassis members 244a, 244b are preferably comprised of 2-inch by 5-inch rectangular steel tubing, 0.25 inches thick and approximately 71 inches long.

Further, in the embodiment shown in FIG. 3, the two second vertical chassis members 246a and 246b are preferably comprised of 2-inch by 5-inch rectangular steel tubing that is 0.25 inches thick. The two second vertical chassis members 246a and 246b extend downward approximately the same distance as the two first vertical chassis members 242a, 242b, i.e., to the approximate height of the main chassis section 206 of the trailer 200. The longitudinal trunk support members 248a, 248b are preferably comprised of 2 inch by 2 inch steel tubing that is 0.120 inches thick. The transverse trunk support struts 250 are preferably comprised of 2 inch by 2 inch angle iron that is ⅛ inch thick. The transverse floor support struts 252 are preferably comprised of pieces of 0.75 inch by 1.5-inch rectangular steel tubing that are 0.75 inches thick and have varying lengths.

FIG. 3 further illustrates that the chassis 202 is configured to provide support for a floor in the second elevated section 210 of the chassis 202. Specifically, two second elevated chassis members 255a, 255b are connected to the two second vertical chassis members 246a, 246b and extend horizontally forward therefrom. The second elevated section 210 of the chassis 202 includes a first transverse strut 256 which is positioned between the forward ends of the second elevated chassis members 255a, 255b. A second transverse strut 257 is also positioned between the second elevated chassis members 255a, 255b towards the forward end of the second elevated section 210 of the trailer. Further, two longitudinal struts 260 extend between the transverse struts 256, 257, at substantially the midpoint of the transverse struts 256, 257. The first and second transverse struts 256, 257 and the two longitudinal struts 260 provide structural support for a hitch assembly 262 so that the hitch assembly 262 can be used to couple the trailer 200 to a vehicle (not shown) that will pull the trailer 200.

In the preferred embodiment, the second elevated chassis members 255a, 255b are comprised of 2-inch by 5-inch rectangular steel tubing that is 0.25 inches thick and approximately 73.75 inches long. The two transverse support struts 256, 257 are preferably comprised of pieces of 2 inch by 5-inch rectangular steel tubing that is 0.25 inches thick and approximately 88.25 inches long. The two longitudinal support struts 260 are preferably included in a standard hitch attaching parts kit designed for the trailer hitch 262. The two longitudinal support struts 260 are centered about the center of the transverse support struts 256, 257 and are spaced approximately 13 inches apart.

Figure 4:
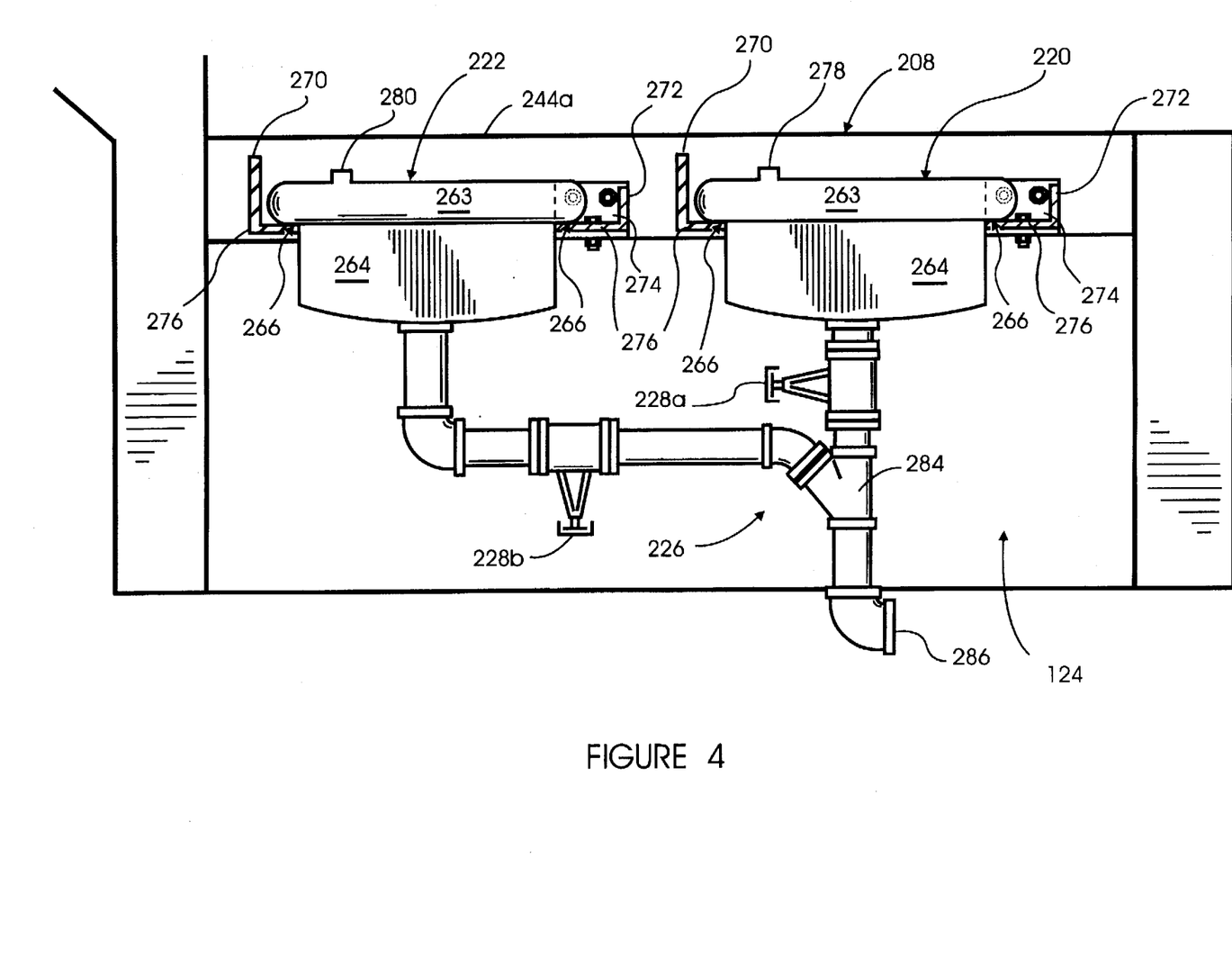
FIG. 4 is a partial perspective view of the chassis assembly shown in FIG. 3, illustrating the configuration of a first elevated section of the chassis configured to receive the sewage tanks.

FIG. 4 is a cross-sectional view of the first elevated section 208 of the chassis 202 which illustrates the manner in which the tanks 220, 222 are mounted on the chassis 202 in the preferred embodiment. The tanks 220, 222 are configured to have a wide upper section 263 and a lower section 264 that is narrower than the upper section 263. Hence a lip 266, which extends substantially the entire length of the tanks 220, 222 transversely across the chassis 202, is formed between the upper section 263 and the lower section 264 on either side of the lower section 264 of both the tanks 220, 222. A lengthwise view of the tanks 220, 222 is shown in FIG. 2B which further illustrates the two sections of the tanks 220, 222. The tanks 220, 222 in the preferred embodiment are 44 gallon tanks having approximate dimensions of 4 inches by 80 inches by 11 inches and are available from Inca Plastics Corporation in Ontario, CA.

Each of the tanks 220, 222 are preferably supported underneath the floor 251 (FIG. 2b) of the first elevated section 208 of the chassis 202 by a pair of bracket members 270, 272 which are coupled to, and extend between, the first elevated chassis members 244a, 244b (see, FIG. 3). In the preferred embodiment, the bracket members 270 are welded at their ends to the first elevated chassis members 244a, 244b and the bracket members 272 are each bolted to a flange member 274 that is bolted to each of the first elevated chassis members 244a, 244b. The bracket members 270, 272 are generally L-shaped pieces of steel where a bottom surface 276 of each of the bracket members 270, 272 is configured to receive the lip 266 of the tanks 220, 222. In the preferred embodiment, the bracket are comprised of 2 inch by 2 inch angle iron that is ⅛ inch thick.

Specifically, in the preferred embodiment, the lip 266 is positioned so as to rest on the bottom surface 276 of each of the bracket members 270, 272. It can be appreciated that installation of the tanks 220, 222 is simplified by welding one of the two bracket members 270 for each tank to the first elevated chassis members 244a, 244b and then bolting the other bracket member 272 for each tank in place. For example, a first lip 266 on a first side of the tank 220 can initially be positioned on the bracket 270 while the bracket 272 is removed from the flange members 274. The opposite or second side of the tank 220 can then be lifted up and the bracket 272 can then be bolted to the flange members 274 while the tank 220 is being lifted out of the way. Subsequently, the second lip 266 on the second side of the tank can then be lowered onto the bottom surface 276 of the bolted bracket member 272. Removal of either of the tanks 220, 222 is also simplified, the bracket 272 simply has to be unbolted from the flange 274, the plumbing connected to the tank has to be disconnected and the tank can be removed.

Hence, in the preferred embodiment, each of the tanks 220, 222 are respectively supported by two bracket members 270, 272 which extend transversely across the width of the chassis 202 between the first elevated chassis members 244a, 244b. The tanks 220, 222 are, therefore, mounted adjacent the floor 251 of the first elevated section 208 of the chassis 202, i.e., adjacent the ceiling of the trunk space 224. Since, in the preferred embodiment, the first elevated section 208 contains the toilet 261 and shower 259, plumbing can be directly run from the toilet to an opening 278 in the upper surface of the upper section 263 of the black-water tank 220. Similarly, in the preferred embodiment, plumbing can be run from the shower through vented pipe fittings and the like to an opening 280 in the upper surface of the upper section 263 of the gray-water holding tank 222. In the preferred embodiment shown in FIG. 4, the tanks 220, 222 extend transversely across the chassis 202. It can be appreciated however, that the tanks 220, 222 can be mounted to extend longitudinally along the elevated section 208 of the chassis 202 by simply mounting brackets 270, 272 of an appropriate length longitudinally along this section of the chassis 202. As is generally understood in the art, the tanks 220, 222 can be mounted in such a way to allow for different bathroom configurations within the trailer 200.

It can be appreciated that, unlike the prior art, designing the chassis 202 to have the first elevated section 208, which is supported by the first elevated chassis members 244a, 244b, allows the tanks 220, 222 to be securely mounted to the chassis 202 adjacent the ceiling of the trunk 224. Hence, the plumbing which connects the bathroom fixtures to the tanks 220, 222 does not extend into the trunk space 224 which allows for more storage inside the trunk space.

Further, as shown in FIG. 4, the only plumbing which is positioned within the trunk 224 is the drain plumbing assembly 226. The drain plumbing assembly 226 in the preferred embodiment includes a y-shaped fitting 284 that receives plumbing from both tanks 220, 222. The bottom end of the y-shaped fitting connects to an exhaust opening 286. The exhaust opening 286 is preferably positioned underneath the level of the transverse trunk support struts 250 (FIG. 3) and hence underneath the floor 249 of the trunk space 224. The exhaust opening 286 is thus preferably positioned immediately underneath the floor of the trunk 224 in a position where it is readily accessible to the user. For example, it would generally be desirable to locate the exhaust opening 286 substantially adjacent one side of the trailer 200 to allow for easy access by the user and to also maximize the available storage space within the trunk space 224 (FIG. 2B).

The drain plumbing assembly 226 is preferably valved to allow the user to selectively drain the tanks 220, 222. In the embodiment shown in FIG. 4, there is a grey-water control valve 228a on the plumbing extending from the grey-water tank 222 to the y-shaped fitting 284. Further, there is black valve 228b that is positioned on the plumbing extending from the black water tank 220 to the shaped fitting 284. In the preferred embodiment, the drain plumbing assembly 226 is comprised of plastic piping such as 3" ABS piping with accompanying valves.

It can be appreciated that, since the tanks 220, 222 are located at top of the trunk space 224, the valves 228a, 228b are positioned within the trunk space 224 and not underneath the chassis 202. In the preferred embodiment, the bottom of the main level 206 of the chassis 202 is approximately 20 inches off of the ground and the bottom of the first elevated section 208 is approximately 46 inches off of the ground. The floor 249 of the trunk space 224 is at substantially the same level as the bottom of the main section 206 of the chassis 202 and the ceiling of the trunk space 224 is at the underside of the first elevated section 208, or approximately 46 inches above the ground.

Hence, since the control valves 228a, 228b are located towards the middle of the trunk space 224, the control valves are approximately 2 to 3 feet off of the ground which makes them readily accessible to the user. The user therefore does not have to climb underneath the trailer 200 to manipulate the control valves to drain the black and gray-water tanks 220, 222 as is generally required with prior art trailers. Rather, the user simply has to open an access door (not shown) to the trunk space 224 and reach in and manipulate the valves 228a, 228b.

Figure 5:
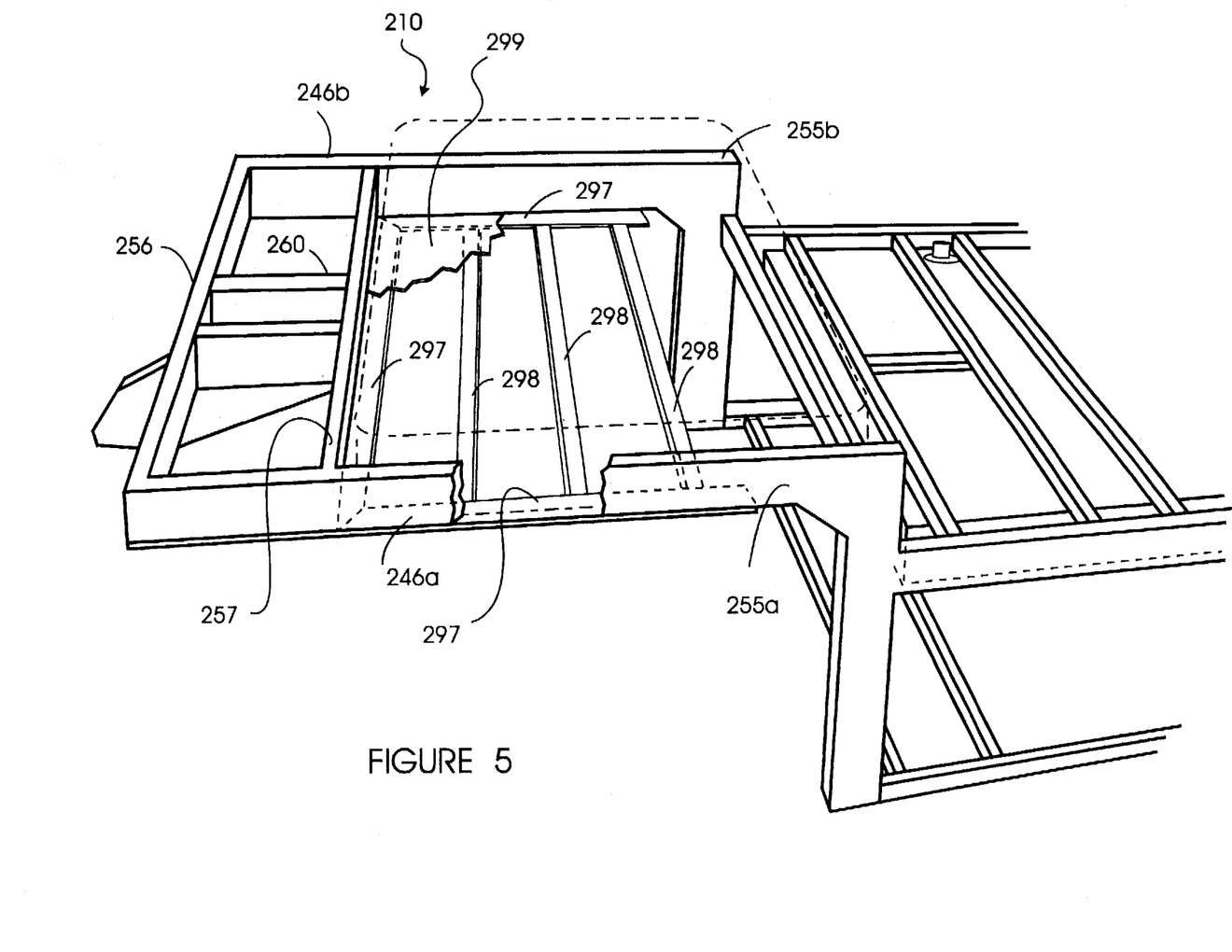
FIG. 5 is a partial perspective view of the chassis assembly shown in FIG. 3 illustrating the configuration of a second elevated section of the chassis configured to support a floor of a bedroom of the trailer.

FIG. 5 illustrates that the second elevated section 210 of the trailer is configured to have the floor mounted towards the bottom of the second elevated chassis members 255a, 255b. Specifically, a railing 297 extends around the interior perimeter of the second elevated chassis members 255a, 255b and the rear transverse strut 257. Floor support struts 298 are then coupled to the railing 297 so as to extend transversely across the chassis 202 of the trailer. A floor 299 (partially shown) of the bedroom 216 is then built on top of the railing 297 and the floor support struts 298. It can be appreciated that using a floor supporting structure, such as the railings 297 and the floor support struts 298, which is attached to the bottom surface of the second elevated chassis members 255a, 255b maximizes the amount of headspace that is provided in the bedroom 216 without increasing the overall height of the trailer 200.

The foregoing description has described a trailer 200 that utilizes an "outboard" design, i.e., the elevated sections 208, 210 of the chassis 202 extend outward from the main section 206 of the chassis 202. This is the result of the transverse chassis strut 240 being wider than the width of the main section 206 of the chassis 202. It can be appreciated, however, that the unique aspects of the double step chassis 202 can be incorporated into different chassis designs.

Figure 6:
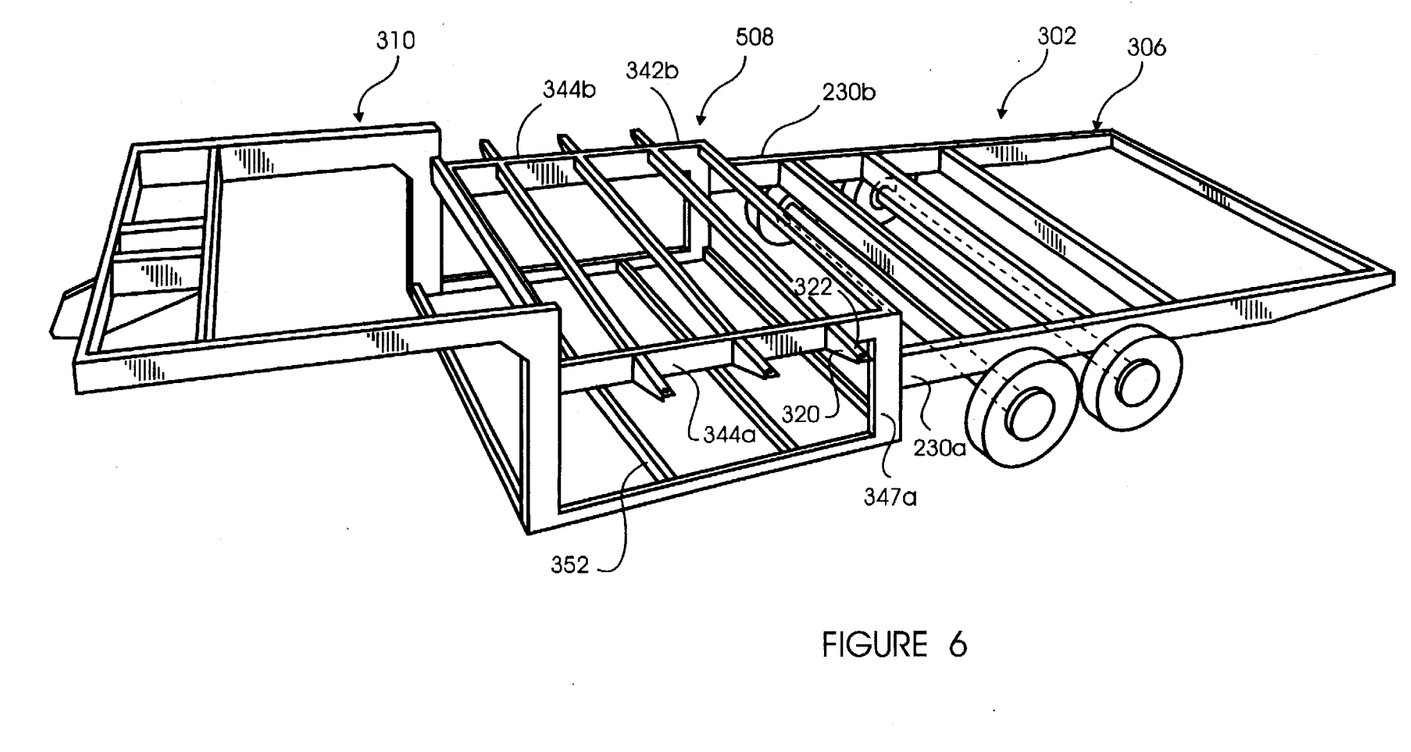
FIG. 6 is an alternate embodiment of a chassis for a trailer.

For example, FIG. 6 illustrates an alternate chassis 302 which includes a main section 306, a first elevated section 308 and a second elevated section 310. As in the embodiment described above, the first elevated section 308 preferably supports a bathroom 214 and the second elevated section preferably supports a bedroom 216. The primary distinction between the chassis 302 and the chassis 202 is that the elevated sections 308, 310 do not extend outward from the main section 306 of the chassis 302. Specifically, in the embodiment shown in FIG. 6, two main side chassis members 230a, 230b are respectively attached to two first vertical chassis members 342a, 342b. Hence, the width of the first elevated section 308 of the chassis 302 is the same as the width of the main section 306 of the chassis 302.

However, in some circumstances it may be desirable that the floor of the bathroom 214 be wider than the actual chassis. To accomplish this, a plurality of outriggers 320 are mounted on the outer surfaces of the first elevated chassis members 344a, 344b. The outriggers 320 are basically comprised of triangular pieces of metal that provide a flat surface 322 co-planar with the surface formed from the elevated chassis members 344a, 344b and a plurality of floor support struts 352. The floor can then be built on top of the floor support struts 352 and the flat surface 322 of the outriggers 320. Hence, the outriggers can extend the width of the trailer in the first elevated section 308. The tanks 220, 222 can then be mounted underneath the floor of the first elevated section 308 of the chassis 302 in the same manner as described above.

The foregoing description has described a chassis wherein the chassis itself is vertically elevated to define a first elevated section that is configured to support the gray- and black-water tanks. This allows for the tanks to be positioned immediately underneath the bathroom fixtures in a trailer which minimizes the amount of space occupied by the plumbing for these fixtures. Further, since the tanks are mounted above the bottom level of the trailer chassis, the user has significantly easier access to the draining control valves which facilitates drainage of the tanks. Additionally, since the drain pipe assembly is enclosed in the storage trunk, fluid in the drain pipe assembly is less likely to freeze in cold weather. Finally, it can also be appreciated that, since the trunk space is located underneath the trailer chassis and underneath the sewage tanks, it is easier to load the storage trunk as the storage trunk is closer to the ground than the storage trunk in the typical prior art fifth wheel trailer and, hence, heavy objects don't need to be lifted as high.

Although the foregoing description of the preferred embodiments of the present invention has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit of the present invention. Consequently, the scope of the invention should not be limited to the foregoing discussion, but should be defined by the appended claims.

What is claimed is:

1. An improved fifth wheel travel trailer having a set of trailer wheels and a chassis overlying said trailer wheels, wherein the chassis has a raised floor and defines a bathroom sitting on said raised floor, whereby at least one plumbing drainage control is located above the bottom of said chassis, and at least one sewage holding tank is located immediately beneath said raised floor, said fifth wheel trailer comprising;

a main chassis section that is coupled to said wheels to allow for rolling motion of said trailer and so that said main chassis section is positioned at a first height above said ground wherein said main chassis section is configured to support a main section of said trailer;

a first elevated chassis section beneath said bathroom, said first elevated section having one end coupled to a first end of said main chassis section so that said chassis section is positioned at a second height above said ground;

one or more of said sewage holding tanks mounted to said first elevated section of said chassis;

a second elevated chassis section beneath the bedroom of said travel trailer, said second chassis section having an end connected to said first elevated chassis section;

a fifth wheel hitch attached to the bottom of said second elevated chassis section;

a storage compartment located below said first elevated section, the bottom of said storage compartment being located approximately in the plane of the bottom of said main chassis section; and said plumbing drainage controls connected to said sewage holding tanks so that the user can drain said sewage tanks into an external sewage receptacle, said plumbing drainage controls being located within said storage compartment above the plane of the bottom of said main chassis section.

2. An improved fifth wheel travel trailer having a raised floor that defines a bathroom sitting on the raised floor, whereby at least one sewage holding tank is located immediately beneath said raised floor, said fifth wheel trailer comprising;

a main chassis section that is coupled to wheels to allow for rolling motion of said trailer and so that a main chassis section is positioned at a first height above said ground wherein said main chassis section is configured to support a main section of said trailer;

a first elevated chassis section beneath said bathroom, said first elevated section having one end coupled to a first end of said main chassis section so that said chassis section is positioned at a second height above said ground;

one or more of said sewage holding tanks mounted to said first elevated section of said chassis;

a second elevated chassis section beneath a bedroom of said travel trailer, said second chassis section having an end connected to said first elevated chassis section;

a fifth wheel hitch attached to the bottom of said second elevated chassis section; and a storage compartment located below said first elevated section, the bottom of said storage compartment being located approximately in the plane of the bottom of said main chassis section.

3. An improved fifth wheel travel trailer having a set of trailer wheels and a chassis overlying said trailer wheels, wherein the chassis has at least one plumbing drainage control is located above the bottom of said chassis, said fifth wheel trailer comprising;

a main chassis section that is coupled to said wheels to allow for rolling motion of said trailer and so that said main chassis section is positioned at a first height above said ground wherein said main chassis section is configured to support a main section of said trailer;

a first elevated chassis section beneath a bathroom, said first elevated section having one end coupled to a first end of said main chassis section so that said chassis section is positioned at a second height above said ground;

a second elevated chassis section beneath a bedroom of said travel trailer, said second chassis section having an end connected to said first elevated chassis section;

a fifth wheel hitch attached to the bottom of said second elevated chassis section;

a storage compartment located below said first elevated section, the bottom of said storage compartment being located approximately in the plane of the bottom of said main chassis section; and said plumbing drainage controls being located within said storage compartment above the plane of the bottom of said main chassis section.

4. A chassis for a trailer that is mounted on at least a pair of wheels comprising:

a main chassis section that is coupled to said wheels to allow for rolling motion of said trailer and so that said main chassis section is positioned at a first height above said ground wherein said main chassis section is configured to support a main section of said trailer;

a first elevated section that is configured to support a bathroom and is coupled to a first end of said main chassis section so that said first elevated section is elevated above said main chassis section so as to be positioned at a second height above said ground wherein a trunk space is defined within the space immediately beneath said first elevated section;

one or more sewage tanks mounted on said first elevated section of said chassis adjacent said trunk space; and a drain assembly connected to said sewage tanks which allows a user to drain said sewage tanks into an external sewage receptacle, wherein said drain assembly includes one or more control valves which are located within said trunk space that said user manipulates to drain said sewage tanks.

5. The chassis of claim 4, wherein said first elevated section is configured to support a floor and one or more fixtures of a bathroom in said trailer.

6. The chassis of claim 5, wherein said first elevated section is configured to support a toilet and a shower positioned on said floor.

7. The chassis of claim 6, wherein said one or more sewage tanks comprises a black water tank that is mounted on said chassis so as to be immediately beneath and substantially adjacent a position where said toilet is to be mounted on said floor built on said chassis.

8. The chassis of claim 7, wherein said one or more sewage tanks also comprises a grey water tank that is mounted on said chassis so as to be immediately beneath and substantially adjacent a position wherein said shower is to be mounted on said floor built on said chassis.

9. The chassis of claim 4, wherein said first elevated section of said chassis includes two spaced apart elevated chassis members that extend longitudinally along said chassis and are interconnected by one or more transverse floor support struts which extend transversely across said chassis between said two elevated chassis members.

10. The chassis of claim 9, wherein said elevated chassis members are respectively connected, at a first end, to two first vertical chassis members that interconnect said elevated chassis members and said main chassis section.

11. The chassis of claim 10, wherein said first elevated section also includes two second vertical chassis members that are respectively connected to a second end of said elevated chassis members and extend downward to substantially said first height of said main chassis section.

12. The chassis of claim 11, wherein two longitudinal trunk support members are respectively connected between said ends of said first and said second vertical chassis members at substantially said first height of said main chassis section.

13. The chassis of claim 12, wherein said trunk space is defined by said elevated chassis members, said first and said second vertical chassis members and said longitudinal trunk support members.

14. The chassis of claim 13, wherein said one or more tanks extend transversely across said chassis between said elevated chassis members so as to be supported at substantially said second height.

15. The chassis of claim 14, wherein said one or more tanks are configured to have one or more lips and said elevated section includes one or more support brackets which extend transversely between said elevated chassis members so that said one or more lips on said tanks rest on said one or more support brackets to retain said one or more tanks in a position adjacent said second height.

16. The chassis of claim 4, wherein said first height is approximately 20 inches above said ground and said second height is approximately 50 inches above the ground and said one or more control valves of said drain assembly are approximately 30 inches of said ground.

17. A chassis for a trailer that is configured to be towed behind a vehicle comprising:

an axle assembly interconnecting a pair of wheels;

a main chassis section having a first and a second end wherein the main chassis section is supported by said axle assembly at a first height above the ground;

a first elevated section having a first and a second end wherein said first end is connected to said second end of said main chassis section so as to be supported at a second height above the ground wherein said second height is elevated above said first height and wherein a trunk space is defined in the space immediately beneath said first elevated section;

one or more sewage tanks mounted on said first elevated section of said chassis adjacent said trunk space; and a drain assembly connected to said sewage tanks and extending downward therefrom, wherein said drain assembly includes control valves that are mounted within said space immediately beneath the first elevated section of the chassis.

18. The chassis of claim 17, further comprising a second elevated section attached to a second end of said first elevated section so as to be supported at a third height above said ground wherein said third height is greater than said second height.

19. The chassis of claim 18, wherein said second elevated section is comprised of a pair of spaced second vertical chassis members having a first and a second end and a top and bottom edge.

20. The chassis of claim 19, wherein said pair of spaced second elevated chassis members are interconnected by one or more struts which extend transversely across said chassis and a hitch assembly can be connected to said struts so as to be positioned at said second end of said second elevated section substantially underneath said second elevated section.

21. The chassis of claim 20, wherein a lip is attached to both of said second elevated chassis members substantially adjacent said bottom edge of said second elevated members wherein said lip is configured to receive a floor for a bedroom to be built on said second elevated section of said chassis.

22. The chassis of claim 21, wherein said first elevated section of said chassis includes two spaced apart elevated chassis members that extend longitudinally along said chassis and are interconnected by one or more transverse floor support struts which extend transversely across said chassis between said two elevated chassis members.

23. The chassis of claim 22, wherein said elevated chassis members are respectively connected, at a first end, to two first vertical chassis members that interconnect said elevated chassis members and said main chassis section.

24. The chassis of claim 23, wherein said first elevated section also includes two second vertical chassis members that are respectively connected to a second end of said elevated chassis members and extend downward to substantially said first height of said main chassis section.

25. The chassis of claim 24, wherein two longitudinal trunk support members are respectively connected between said ends of said first and said second vertical chassis members at substantially said first height of said main chassis section.

26. The chassis of claim 25, wherein said trunk space is defined by said elevated chassis members, said first and said second vertical chassis members and said longitudinal trunk support members.

27. The chassis of claim 26, wherein said one or more tanks extend transversely across said chassis between said elevated chassis members so as to be supported at substantially said second height.

28. The chassis of claim 27, wherein said one or more tanks are configured to have one or more lips and said elevated section includes one or more support brackets which extend transversely between said elevated chassis members so that said one or more lips on said tanks rest on said one or more support brackets to retain said one or more tanks in a position adjacent said second height.

29. The chassis of claim 17, wherein said first height is approximately 20 inches above said ground and said second height is approximately 50 inches above the ground and said one or more control valves of said drain assembly are approximately 30 inches of said ground.

30. A chassis for a trailer that is configured to be towed behind a vehicle comprising:

an axle assembly interconnecting a pair of wheels;

a main chassis section having a first and a second end wherein said main chassis section is supported by said axle assembly at a first height above the ground;

a first elevated section having a first and a second end wherein a first end is connected to said second end of said main chassis section so as to be supported at a second height above the ground wherein said second height is elevated above the first height and wherein the space immediately beneath said first elevated section defines a trunk space;

a second elevated section attached to a second end of said first elevated section so as to be supported at a third height above said ground wherein said third height is greater than said second height;

one or more sewage tanks mounted on said first elevated section of said chassis so as to extend transversely across said chassis; and a drain assembly connected to said sewage tanks and extending downward therefrom, through said trunk space, wherein said drain assembly includes control valves that are mounted within said trunk space.

31. The chassis of claim 30, wherein said first elevated section of said chassis includes two spaced apart elevated chassis members that extend longitudinally along said chassis and are interconnected by one or more transverse floor support struts which extend transversely across said chassis between said two elevated chassis members.

32. The chassis of claim 31, wherein said elevated chassis members are respectively connected, at a first end, to two first vertical chassis members that interconnect said elevated chassis members and said main chassis section.

33. The chassis of claim 32, wherein said first elevated section also includes two second vertical chassis members that are respectively connected to a second end of said elevated chassis members and extend downward to substantially said first height of said main chassis section.

34. The chassis of claim 33, wherein two longitudinal trunk support members are respectively connected between said ends of said first and said second vertical chassis members at substantially said first height of said main chassis section.

35. The chassis of claim 34, wherein said trunk space is defined by said elevated chassis members, said first and said second vertical chassis members and said longitudinal trunk support members.

36. The chassis of claim 35, wherein said one or more tanks extend transversely across said chassis between said elevated chassis members so as to be supported at substantially said second height.

37. The chassis of claim 36, wherein said one or more tanks are configured to have one or more lips and said elevated section includes one or more support brackets which extend transversely between said elevated chassis members so that said one or more lips on said tanks rest on said one or more support brackets to retain said one or more tanks in a position adjacent said second height.

* * * * *